May 12, 1959 W. H. FRICK 2,885,821
ROTATABLE RUBBER BUMPER
Filed Oct. 22, 1956 3 Sheets-Sheet 1
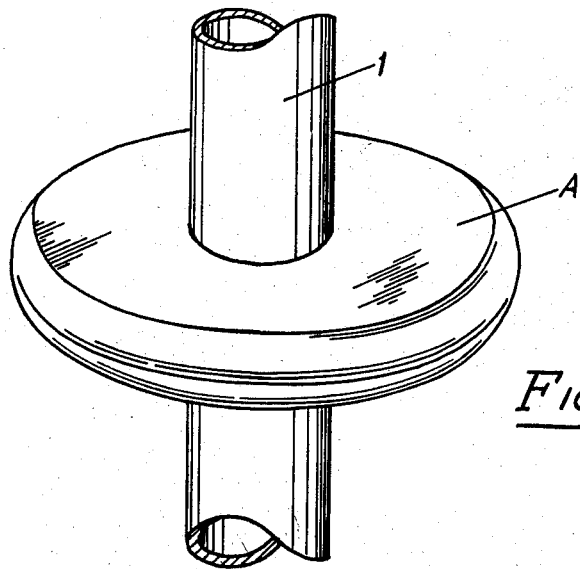
Fig.1
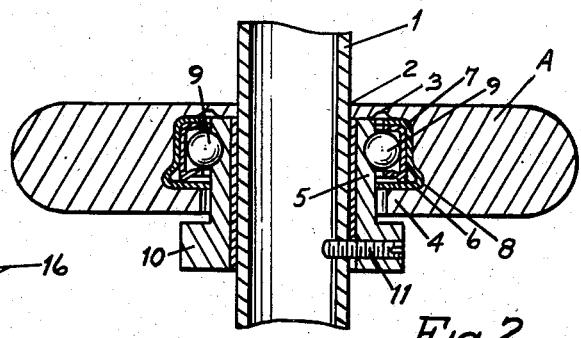
Fig.2
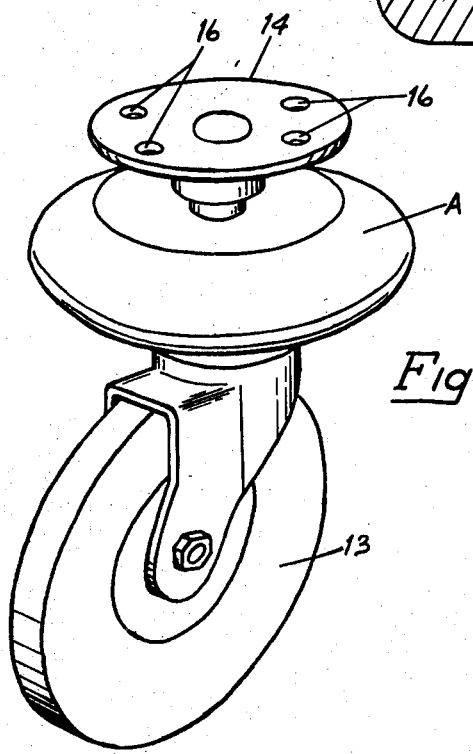
Fig.3
INVENTOR.
WILLIAM H. FRICK
BY
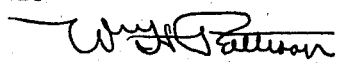
ATTORNEY May 12, 1959

W. H. FRICK 2,885,821

ROTATABLE RUBBER BUMPER

Filed Oct. 22, 1956

INVENTOR.
WILLIAM H. FRICK
BY
ATTORNEY

May 12, 1959  W. H. FRICK  2,885,821
ROTATABLE RUBBER BUMPER
Filed Oct. 22, 1956  3 Sheets-Sheet 3

INVENTOR.
WILLIAM H. FRICK
BY
ATTORNEY

United States Patent Office 2,885,821
Patented May 12, 1959

2,885,821

ROTATABLE RUBBER BUMPER

William H. Frick, Cleveland, Ohio

Application October 22, 1956, Serial No. 617,340

4 Claims. (Cl. 45—137)

This invention relates to a bumper, but more particularly and specifically to a rotatable rubber bumper.

Although the bumper might have many and varied uses it has been conceived particularly for use on or with mobile equipment to protect the equipment and to protect the furnishings and surroundings in which the equipment is used. Mobile equipment need not be of any special or specific type, but in the drawings the bumper is illustrated specifically with kitchen and restaurant equipment which provides transportation of food and kitchen and tableware between the kitchen and a dining room.

The primary object of the invention is the provision of a novel and improved rotary bumper.

A further object of the invention is the provision of the bumper in combination with mobile equipment.

A still further and important object is the provision of a novel rubber bumper or rubber annulus for quick and easy application to and removable from a roller bearing upon which it is mounted for rotation.

Other objects of the invention as well as advantages in its use will appear from the following description when read in the light of the accompanying drawings.

In the drawings:

Fig. 1 is a perspective view of the bumper in association with a vertical standard.

Fig. 2 is a vertical sectional view through Fig. 1.

Fig. 3 is a perspective view of the bumper in combination with a caster wheel.

It has been found highly desirable and advantageous to provide bumpers for mobile carriers and like movable objects to protect not only the carriers and the objects but to protect the furnishings and equipment in the room or rooms in which the mobile carrier is operated so as to protect those furnishings against marring and injury.

Many carriers or other movable objects incorporate in their constructions vertical standards and the construction illustrated in Figs. 1 and 2 of the drawings illustrate the manner of associating the present improved bumper with a vertical standard.

Figure 9:
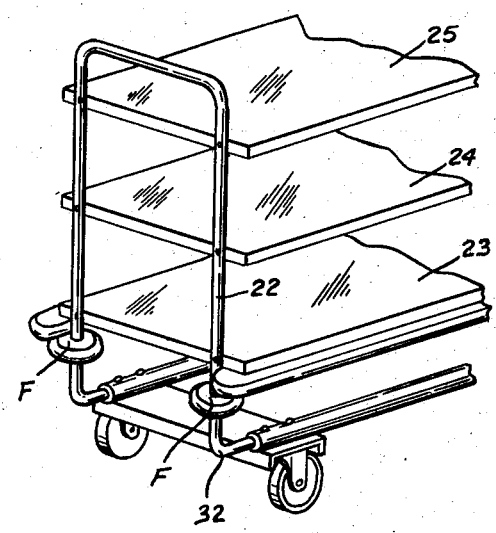
Fig. 9 is a perspective view showing the construction of Fig. 8 in use on a mobile carrier.

1 is a standard such as can be found forming part of the frame of a mobile carrier such as for instance that illustrated in Fig. 9 of the drawings. This standard is in the form of a hollow circular tube.

The bumper is designated as an entirety by A and is composed of soft rubber and is circular, that is, of a wheel-shape. The bumper is carried on or carries a roller bearing. The construction of the bumper and the roller bearing will be apparent by reference to Fig. 2.

Here it will be seen that the bumper is in general similar to a solid rubber tire. It is provided with a central passageway 2 for receiving and encircling the standard. Intermediate the length of the passageway the bumper is provided with a chamber which is defined by a side wall 3 which extends over to and substantially abuts the outer face of the standard. The chamber has a second and oppositely positioned side wall 4 which is much shorter than the side wall 3 inasmuch as it stops far short of the supporting tube or standard. The chamber has an open side into the passageway and has a rear wall against which abuts the roller bearing, as will be hereinafter specifically described. The chamber extends completely around the central passageway and is substantially L-shaped in configuration.

The roller bearing comprises an inner raceway 5 which is in the form of a tubular element and an outer raceway 6 which is carried by or within a ring 7 which has at one of its edges a circumferential bulge to form a flange 8. A plurality of roller balls 9 are confined between the two raceways. At one of its ends the inner raceway is circumferentially flanged by a collar 10 which threadedly carries a set screw 11.

Inasmuch as the bumper is of soft and resilient rubber the bumper is resiliently secured to the roller bearing or, which is the same, the roller bearing is resiliently secured within the bumper. In assembling the bumper and roller bearing the short side wall 4 of the bumper chamber is deformed outwardly and the roller bearing inserted and then the wall 4 is permitted to return to the position illustrated in Fig. 2 of the drawings. The bumper side walls 4 and 7 prevent longitudinal movement of the bearing, or stated another way, prevent displacement of the bumper from the bearing. The rear wall of the chamber is shaped to receive the bulge or flange 8 of the roller bearing ring 7, and due to the resiliency of the bumper the bumper and the roller bearing are secured to one another under resilient tension.

With the construction illustrated and described the bumper can be rapidly and easily applied to or removed from the roller bearing, or to express it reversely, the roller bearing can be quickly secured in or removed from the chamber of the bumper.

Once the proper position of the bumper on the standard is determined, it can be secured against movement longitudinally of the standard 1 by the set or lock screw 11.

So far as the bumper and roller bearing and their manner of securement one to the other is concerned, the construction is identical in all forms illustrated in the drawings, except for a slight modification in Fig. 8, and therefore repeated description hereinafter is unnecessary.

Figure 4:
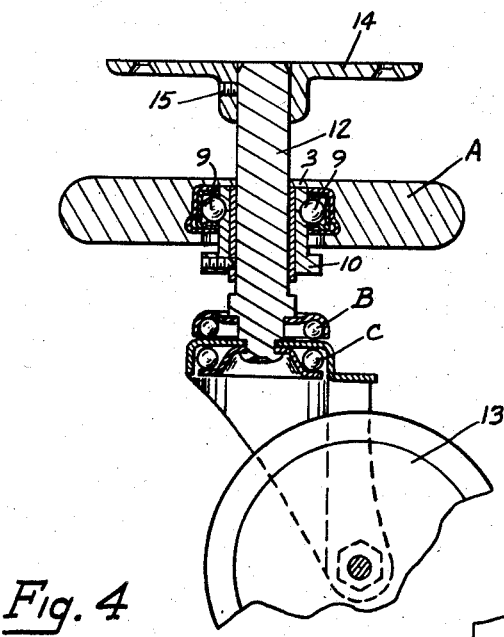
Fig. 4 is a vertical sectional view of the Fig. 3 arrangement.
Figure 5:
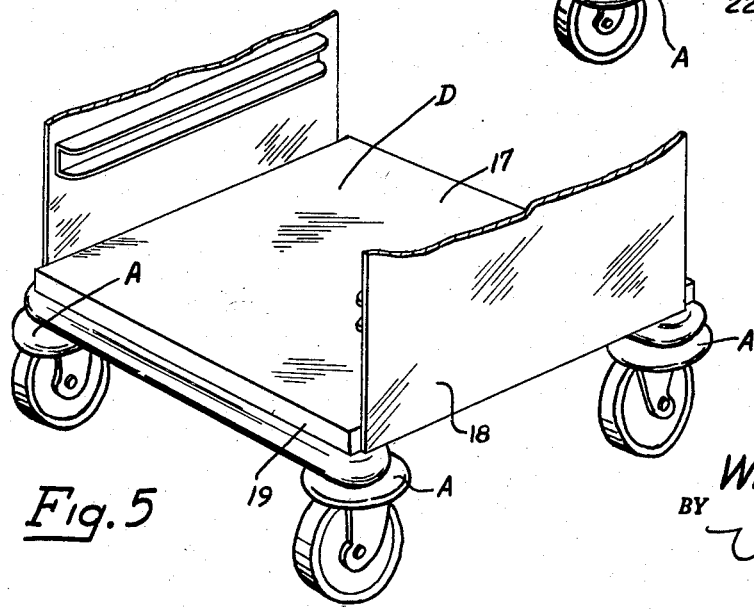
Fig. 5 is a perspective view illustrating the arrangement of Fig. 3 in combination with the lower end of a mobile carrier.

Figs. 3 to 5 inclusive illustrate the improved bumper and roller bearing in combination with a caster wheel and the caster wheel in combination with a mobile carrier.

Having reference to Figs. 3 and 4, the bumper A with its roller bearing is rotatably mounted on the stem 12 of a caster wheel 13. Specifically the caster is of the roller bearing type. A pair of roller bearings B and C are illustrated but inasmuch as these form no part of the present invention and inasmuch as the use of roller bearings with caster wheels is well known, specific description of these roller bearings is unnecessary.

The upper end of the caster stem is provided with an attachment plate 14 which is detachably secured thereto by means of a set screw 15. The caster plate is provided with a plurality of bolt or screw holes 16. One manner of use of the construction appearing in Figs. 3 and 4 is illustrated in Fig. 5 where four caster wheels embodying the present invention are attached to four corners of a mobile carrier D, which is shown merely in part so far as the actual configuration of the upper part of the carrier is concerned. In this figure of the drawings it will be apparent that the plates 14 are secured to the base or bottom 17 of the carrier. It is also to be noted that the bumpers are so positioned and are of such a size that each of them extends horizontally outward beyond an adjacent side of the carrier. That is to say, for instance the bumper extends outwardly beyond the carrier side 18 and the carrier front edge 19.

With bumpers at the four corners of the carrier they serve to protect the carrier against hard or drastic blows, which is very advantageous in carriers loaded with dishes or the like and the bumpers of course also protect the walls, furniture and equipment of the room or building about which the carrier is being moved.

Figure 6:
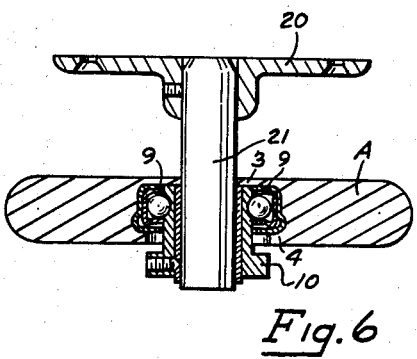
Fig. 6 is a vertical sectional view of a modified form of the invention.
Figure 7:
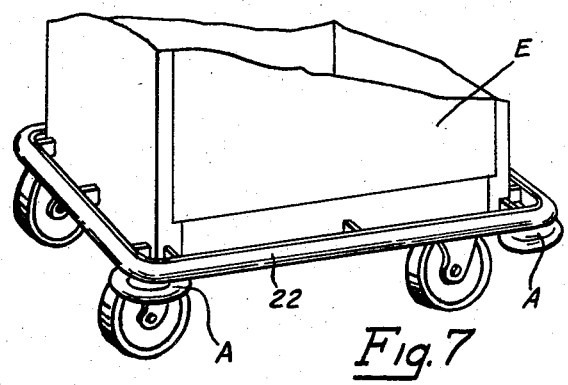
Fig. 7 is a perspective view of the lower end of a mobile carrier showing the construction of Fig. 6 in combination therewith.

Another application of the bumper so far as use is concerned, is illustrated in Figs. 6 and 7. The construction here is very similar to that apearing in Fig. 4 of the drawings except that the plate 20 is provided with a stub shaft 21 to which the bumper is secured for rotation. In other words, the stub shaft 21 replaces the caster stem 12.

This particular construction is suitable for use with a carrier such as that designated E in Fig. 7 of the drawings. In this instance a bumper is secured adjacent each lower corner of the carrier and in each instance the plate 20 is secured to a corner of a carrier encircling frame or bar 22 so as to depend from the underside thereof with each bumper extending outwardly beyond the two adjacent sides of the carrier.

Figure 8:
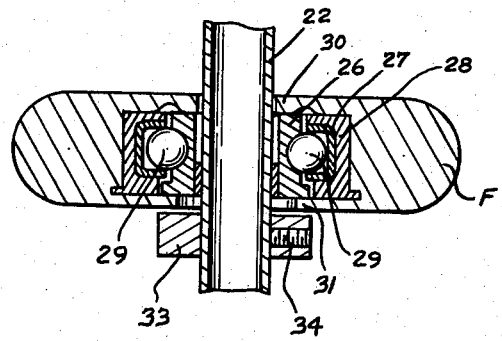
Fig. 8 is a vertical sectional view of a still further modified form of bumper.

A still further modification of the invention appears in Figs. 8 and 9 of the drawings although the construction here is somewhat similar to the construction as heretofore described. In this instance the standard or support 22 for each bumper is a vertical tubular element forming a part of a frame which in turn supports a plurality of shelves 23, 24 and 25 of the mobile carrier shown in part in Fig. 9.

The bumper comprises a soft rubber annulus which is resiliently secured to the roller bearing. The annulus F, like the heretofore described bumpers, is of soft rubber and has the central passageway with the surrounding chamber for the reception of the roller bearing composed of an inner raceway 26 and an outer raceway 27 carried by the outer ring 28. These elements form the closed raceway for the roller balls 29. The bumper or annulus has a long side wall 30 overlying the top of the bearing and a short side wall 31 which can be deformed to permit insertion of the bearing in the bumper.

In this arrangement the inner raceway does not carry a collar like the collar 10 in the Fig. 2 construction and its omission is for a purpose.

The bumpers are to be placed on the carrier tubes or frame elements which at their lower ends are bent as at 32. The heretofore mentioned bearing collar 10 is omitted so as to permit the bumper to travel around the bend 32 in the carrier frame. A separate collar in the form of a nylon ring 33 supports the bumper at the desired height or point along the carrier frame upright 22. This collar or ring supports the bumper and is secured at the desired selected position on the tube by means of a set screw 34. This element makes it possible to slide the bumper and its roller bearing around the carrier frame tube bend and to move the supporting ring 33 also around the tube bend without difficulty.

From the foregoing it will be seen that I have provided a novel construction wherein the bumper and the roller bearing are quickly and easily attachable and separable from one another and that the several constructions make it possible to apply the bumper either directly to the carrier or to a caster of the carrier. It will also be seen that in all forms of the invention these bumpers rotate freely and easily to serve the purpose for which they are designed and that they extend outwardly sufficiently far to protect a pair of adjacent sides of a side and an adjacent end of a carrier.

What I claim is:

1. A device of the character described comprising, a round tubular support, a bumper in the form of an annulus of soft rubber, and a roller bearing to which the bumper is removably secured under resilient tension, said bumper having a central passageway adapted to receive and encircle the roller bearing, a circumferential chamber intermediate the length of the bumper passageway, the chamber being substantially U-shaped and having an open side facing and communicating with the bumper central passageway, one side wall of the chamber extending to a point closely adjacent the support, the other side wall of the chamber being shorter, the rear wall of the chamber being provided with a circumferential groove, the roller bearing having a collar having therein a raceway for roller balls, a raceway encircling an end of the collar and forming with the collar a roller ball retaining chamber, a ring encircling the last named raceway and provided with an outwardly extending flange, the short wall of the bumper chamber being deformable outwardly to permit the insertion of the roller bearing with the top of the bearing abutting the longer side wall of the bumper chamber, the flange of the roller bearing being disposed within the groove in the rear wall of the bumper chamber, the shorter wall of the bumper chamber extending beneath the bottom of the roller bearing outer ring and retaining the roller bearing in the bumper housing against longitudinal displacement therefrom, the roller bearing collar encircling the support, and means securing the roller bearing collar to the support against movement in respect thereto.

2. A device of the character described comprising, a round tubular support, a bumper in the form of an annulus of soft rubber, and a roller bearing to which the bumper is removably secured under resilient tension, said bumper having a central passageway adapted to receive and encircle the roller bearing, a circumferential chamber intermediate the length of a bumper passageway, the chamber being substantially U-shaped and having an open side facing and communicating with the bumper central passageway, one side wall of the chamber extending to a point closely adjacent the support, the other side wall of the chamber being shorter, the roller bearing having a collar having therein a circumferential groove forming an inner raceway for roller balls, an outer raceway encircling the collar and forming with the collar groove a roller ball retaining chamber, a ring encircling the last named raceway, the short wall of the bumper chamber being deformable outwardly to permit the insertion of the roller bearing with the top of the bearing abutting the longer side wall of the bumper chamber, the shorter wall of the bumper chamber extending beneath the bottom of the roller bearing outer ring and retaining the roller bearing in the bumper housing against longitudinal displacement therefrom, the roller bearing collar encircling the support, and means securing the roller bearing collar to the support against movement in respect thereto.

3. A rotatable roller bumper assembly comprising, a resilient roller having a centrally positioned axial bore, a tubular support extending through the roller bore, a roller bearing, the bearing having an inner and an outer raceway, the inner raceway encircling the tubular support, roller balls between said raceways, means securing the inner raceway to the tubular support against both axial and longitudinal movement in respect to the support, the resilient roller in that side face defining the axial bore being provided with a circumferentially extending chamber having an open side communicating with the axial bore, the resilient roller chamber having side walls one of which is deformable to permit the entry of the roller bearing into the chamber and the removal of the resilient roller from the bearing, and the upper and lower walls of said chamber resiliently engaging the roller bearing and retaining the resilient roller on the bearing.

4. A device of the character described comprising, a round tubular support, a bumper in the form of an annulus of soft rubber, and a roller bearing to which the bumper is removably secured under resilient tension, said bumper having a central passageway adapted to receive and encircle the roller bearing, a circumferential chamber intermediate the length of a bumper passageway, the chamber having an open side facing and communicating with the bumper central passageway, one side wall of the chamber extending to a point closely adjacent the support, the other side wall of the chamber being shorter, the roller bearing having a collar having therein a circumferential groove forming an inner raceway for roller balls, an outer raceway encircling the collar and forming with the collar groove a roller ball retaining chamber, the short wall of the bumper chamber being deformable outwardly to permit the insertion of the roller bearing into the bumper chamber, the shorter wall of the bumper chamber extending beneath the bottom of the roller bearing and retaining the roller bearing in the bumper housing against longitudinal displacement therefrom, the roller bearing collar encircling the support, and means securing the roller bearing collar to the support against movement in respect thereto.

References Cited in the file of this patent

UNITED STATES PATENTS

| | | |
|---|---|---|
| 1,581,971 | Mantsion | Apr. 20, 1926 |
| 1,595,582 | Stedman | Aug. 10, 1926 |
| 1,923,163 | Noelting | Aug. 22, 1933 |
| 2,290,001 | Sherman | July 14, 1942 |
| 2,476,193 | Hirschmugl | July 12, 1949 |